(12) United States Patent
Miyazaki et al.

(10) Patent No.: US 7,490,335 B2
(45) Date of Patent: Feb. 10, 2009

(54) DISK TRAY AND DISK DRIVE

(75) Inventors: Akihiro Miyazaki, Kanagawa (JP); Yuka Yamasaki, Kanagawa (JP); Atsumu Takahashi, Chiba (JP); Mikio Kato, Kanagawa (JP)

(73) Assignee: Sony Corporation, Tokyo (JP)

(*) Notice: Subject to any disclaimer, the term of this patent is extended or adjusted under 35 U.S.C. 154(b) by 522 days.

(21) Appl. No.: 11/221,840

(22) Filed: Sep. 9, 2005

(65) Prior Publication Data
US 2006/0101478 A1 May 11, 2006

(30) Foreign Application Priority Data
Sep. 14, 2004 (JP) .............................. 2004-267403

(51) Int. Cl.
*G11B 17/04* (2006.01)
(52) U.S. Cl. .................................................... 720/612
(58) Field of Classification Search ................ 720/612, 720/601, 600, 603, 611, 613; 369/263.1
See application file for complete search history.

(56) References Cited

U.S. PATENT DOCUMENTS

| | | | |
|---|---|---|---|
| 6,009,060 A | * | 12/1999 | Kim .......................... 720/603 |
| 6,785,897 B2 | * | 8/2004 | Takizawa et al. ............ 720/601 |
| 6,815,852 B2 | * | 11/2004 | Horng et al. ............... 310/67 R |
| 2005/0151825 A1 | * | 7/2005 | Sukigara et al. ............. 347/225 |

FOREIGN PATENT DOCUMENTS

| | | |
|---|---|---|
| JP | 3-104053 | 5/1991 |
| JP | 11167766 A | * 6/1999 |

* cited by examiner

*Primary Examiner*—Allen T Cao
(74) *Attorney, Agent, or Firm*—Oblon, Spivak, McClelland, Maier & Neustadt, P.C.

(57) ABSTRACT

A disk tray includes a storage concave portion that is to store a disk-shaped recording medium. The disk tray is supported by a carrying mechanism to thereby be carried from an opening portion provided to a front face of an apparatus main body (main body of an apparatus for storing the disk tray) over a range between the inside and outside of the apparatus main body, the disk tray comprising. The disk tray further includes a buffer material provided on a peripheral surface of the storage concave portion that stores the disk-shaped recording medium. Thereby, the disk-shaped recording medium, such as an optical disk, is restrained from being crushed even when being rotationally driven at high speed.

6 Claims, 6 Drawing Sheets

DISK TRAY AND DISK DRIVE

CROSS REFERENCES TO RELATED APPLICATIONS

The present invention contains subject matter related to Japanese Patent Application JP 2004-267403 filed in the Japanese Patent Office on Sep. 14, 2004, the entire contents of which being incorporated herein by reference.

BACKGROUND OF THE INVENTION

1. Field of the Invention

The present invention relates to disk drives that each perform recording and/or playback of an information signal on a disk-shaped recording medium. More particularly, the invention relates to a disk drive and a disk tray, wherein when a disk-shaped recording medium is mounted on the disk tray being carried in the horizontal direction between the inside and outside of an apparatus main body (main body of the disk drive), and the disk tray is retracted into the apparatus main body, then the disk-shaped recording medium is rotatably mounted on an internal turn table.

2. Description of the Related Art

Hitherto, optical disks, such as CDs (compact disks) and DVDs (digital versatile disks) have been widely known, and there have been provided disk drives of the type that performs recording and/or playback of an information signal on such an optical disk.

Disk drives include those wherein an optical disk is mounted on a disk tray horizontally ejected into and retracted from a main body of the disk drive ("apparatus main body," hereafter), whereby the optical disk is automatically set on an internal turn table when the disk tray is retracted. Generally, a disk drive of this type has a disk tray, an apparatus main body (main body of the disk drive), a carrying mechanism, a disk rotation drive mechanism, and an optical pickup mechanism. The disk tray has a storage concave portion wherein an optical disk is stored. The apparatus main body is formed into a substantially rectangular box shape, and has a rectangular opening portion formed in a front face thereof through which the disk tray is ejected. The carrying mechanism carries the optical disk between the inside and outside of the apparatus main body. The disk rotation drive mechanism performs rotational driving of the optical disk stored in a storage concave portion of the disk tray. The optical pickup mechanism performs recording and/or playback of an information signal on the optical disk.

In such the disk drive, when the optical disk is stored inside the storage concave portion of the disk tray ejected outside the apparatus main body from the rectangular opening portion, the disk tray is carried into the apparatus main body through operation of the carrying mechanism. The optical disk, which has been carried into the apparatus main body, is rotatably retained on the turn table of the disk rotation drive mechanism. In addition, the optical disk is rotational driven by a spindle motor at a CLV (constant linear velocity), CAV (constant angular velocity), or a combination thereof. Further, the optical pickup mechanism performs recording and/or playback of the information signal on the optical disk being rotationally driven.

For disk drives operating corresponding to recordable optical disks, there are trends toward the fact that also the speed of optical disk rotation driven by the disk rotation drive mechanism is required to be enhanced in association with requirements for write speed enhancement. For example, in the case of a disk drive performing hyper-speed recording of data on a write-once DVD, when hyper four-fold speed recording is shifted to eight-fold speed recording, the speed of rotation of the DVD by a spindle motor is 9,000 rpm or higher.

In such an event, when the optical disk has a crack, scratch, or the like, a case can take place where in the rotational driving, the optical disk is crashed, and debris of the optical disk is dispersed outside the apparatus main body from the rectangular opening portion. More specifically, during a long-time use of optical disks by a user, cases can take place where, for example, an optical disk is dropped, and/or unreasonable forces exert on an optical disk when being taken out from a disk package. Thereby, a crack or scratch can occur in a peripheral portion of the center hole and the like of the disk. In addition, cases can take place where optical disks on commercial markets include inferior products (disks) not having durability sufficient to withstand high speed rotational driving.

When such a cracked optical disk or defective disk regarded as an inferior product having low durability is rotationally driven at high speed, there can occur a case where the optical disk is cracked to the extent of touching the peripheral wall provided to the storage concave portion of the disk tray, whereby the disk is crashed. In addition, a case can take place where debris of the optical disk caused by crushing thereof receives energy developed by the high speed rotation of the optical disk disperses in the disk drive, and various components provided inside the apparatus main body is damaged. In this case, a case can occur where part of the debris is forced out of a rectangular opening portion provided to the front face of the apparatus main body, consequently causing the user to be harmed. Further, in stages of, for example, manufacture, inspection, and maintenance/repair of the disk drive, components such as a top cover and front panel of the apparatus main body are not mounted. As such, a case can occur where the optical disk is rotationally driven with the disk tray in a bare or uncovered state, whereby crushing of optical disk causes damage on the apparatus main body.

To prevent such dispersion of debris of an optical disk, various disk drives have been proposed. For example, a disk drive has been proposed wherein the peripheral wall provided in the storage concave portion of the disk tray is formed with an increased height, and the rotation cover for covering the rectangular opening portion is additionally provided. According to another disk drive proposed, the sidewall is provided in the vicinity of the optical disk in addition to the peripheral wall of the storage concave portion (see Japanese Unexamined Patent Publication No. 2004-133964, for example).

However, an increase in the size of the disk tray is involved in either of the proposed disk drives, i.e., one wherein the peripheral wall of the storage concave portion is formed with the increased height, and the other one wherein the rotation cover for covering the rectangular opening portion is additionally provided to the disk tray. The size increase is consequently increases constraints of the design or design process of the apparatus main body. Further, problems still remain unresolved in the configuration formed with the simple countermeasure, wherein without a rotation cover being provided, only the peripheral wall is formed with the increased height, or only the sidewall is formed in the disk tray. In the respective configuration, when a defective disk is rotationally driven at high speed, the disk possibly touches the peripheral wall and/or sidewall to the extent of being crushed, thereby causing fine debris of the disk to disperse from the rectangular opening portion of the apparatus main body.

SUMMARY OF THE INVENTION

Under the circumstances described above, it is desirable to provide a disk drive and a disk tray for the disk drive that, even when a cracked optical disk, an optical disk, or the like regarded as an inferior product lacking durability is used and rotationally driven at high speed, is capable of restraining crushing of the optical disk and minimizing damage attributed to debris caused by the crushing.

According to an embodiment of the present invention, a disk tray is provided that has a storage concave portion that stores a disk-shaped recording medium, wherein the disk tray is supported by a carrying mechanism to thereby be carried from an opening portion provided to a front face of an apparatus main body (main body of an apparatus for storing the disk tray) over a range between the inside and outside of the apparatus main body, wherein the disk tray includes a buffer material provided on a peripheral surface of the storage concave portion that stores the disk-shaped recording medium.

According to another embodiment of the present invention, a disk drive is provided that has an apparatus main body (main body of the disk drive); a disk tray that is provided in the apparatus main body and that includes a storage concave portion for storing a disk-shaped recording medium; a carrying mechanism that carries the disk tray over a range between the inside and outside of the apparatus main body from an opening portion provided to a front face of the apparatus main body; a disk rotation drive mechanism that retains the disk-shaped recording medium carried into the apparatus main body and that rotationally drives the disk-shaped recording medium; and a recording/playback mechanism that performs recording and/or playback of an information signal on the disk-shaped recording medium rotationally driven, wherein the disk tray includes a buffer material provided on a peripheral surface of the storage concave portion that stores the disk-shaped recording medium.

According to the disk tray and the disk drive, in the event of performing high speed recording by rotating the optical disk at high speed, even when the optical disk is cracked by the load associated with the high speed rotation because of presence of a crack or scratch on the optical disk, since the buffer material is provided on the peripheral wall of the storage concave portion formed in the disk tray, shock due to collision with the peripheral wall can be reduced by the buffer material. Accordingly, while large debris of the optical disk occurs, small debris as developed by crushing does not occur. Consequently, dispersion of debris of the optical disk can be avoided.

BRIEF DESCRIPTION OF THE DRAWINGS

The present invention will be more fully understood in conjunction with the following detailed description and accompanying drawings, wherein.

DETAILED DESCRIPTION OF THE PREFERRED EMBODIMENTS

A disk tray and a disk drive to which the present invention has been adapted will be described hereinbelow with reference to the accompanying drawings. A disk drive 1 shown is capable of performing playback of information recorded in an optical disk, such as a CD or DVD. In addition, the disk drive 1 is capable of performing writing information on a signal-recordable optical disk, such as a CD-R, DVD-R, or DVD-RW. The disk drive 1 can be used for a standard optical disk of 12 cm in diameter disk and a small optical disk of 8 cm in diameter.

Figure 1:
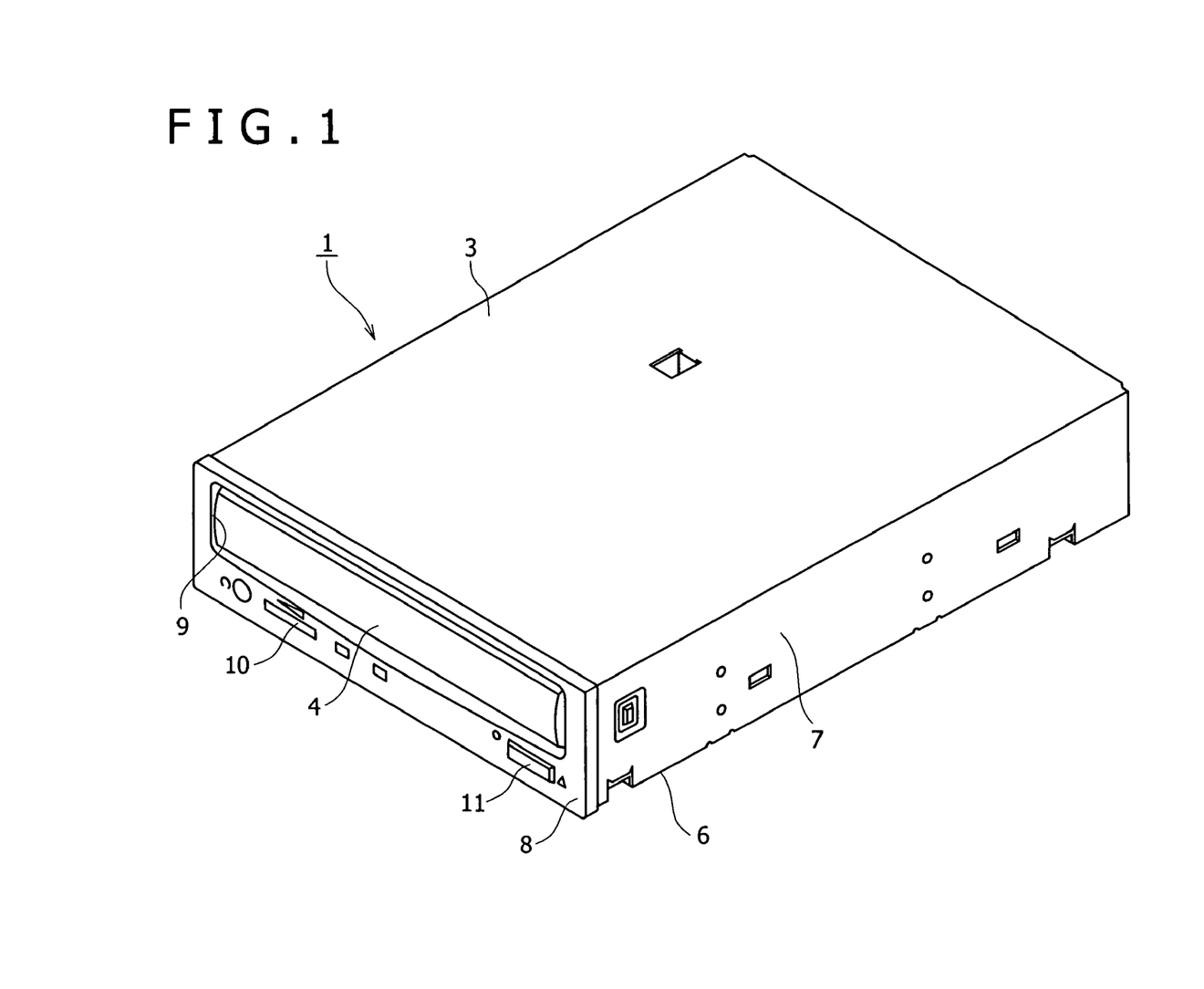
FIG. 1 is a perspective view showing a disk drive to which the present invention is adapted.
Figure 2:
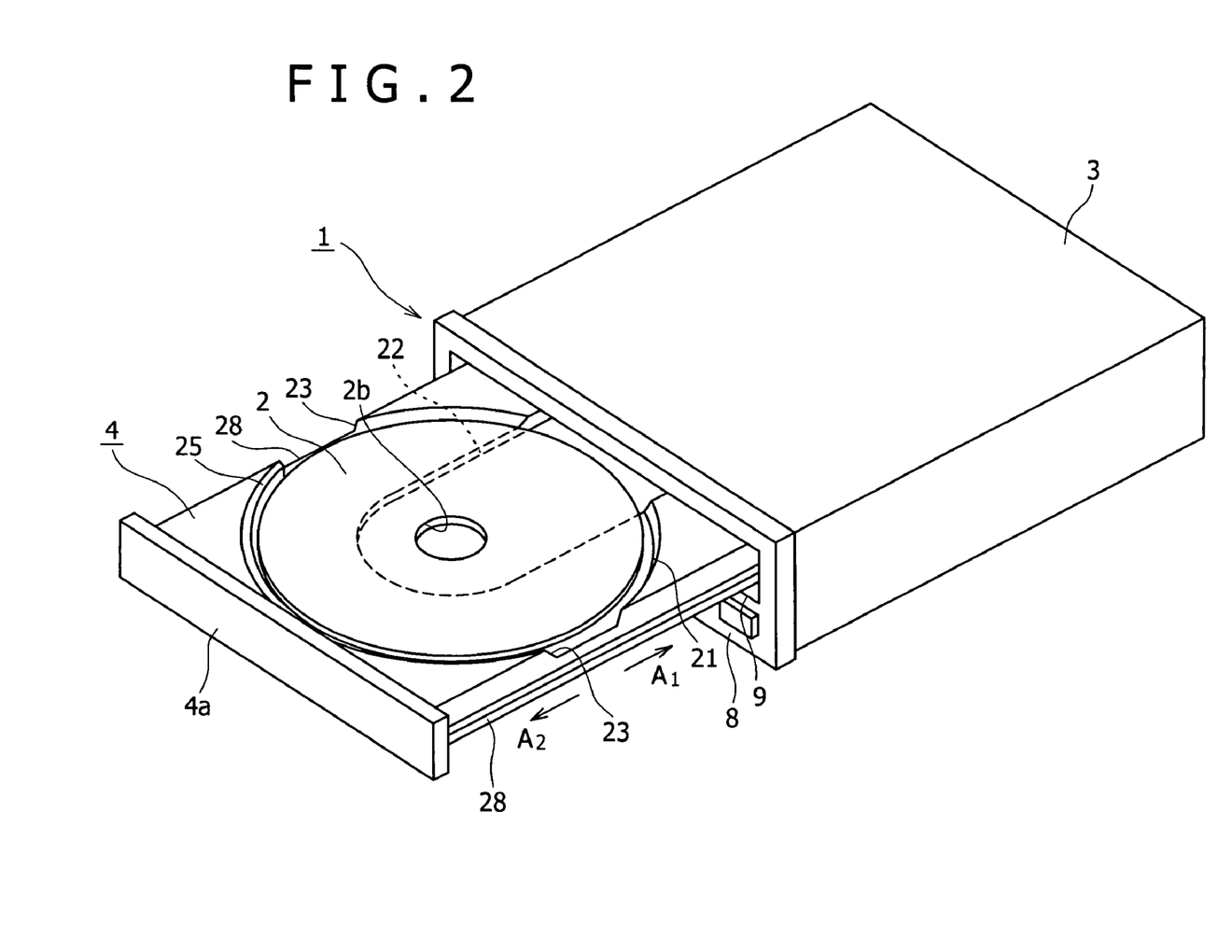
FIG. 2 is a perspective view showing the disk drive with an ejected disk tray.

As shown in FIGS. 1 and 2, the disk drive 1 has a disk tray 4 that is moved between the inside and outside of an apparatus main body 3. After the optical disk 2 has been mounted on the disk tray 4 extended to the side of a front face of the apparatus main body 3, the disk tray 4 is extracted into the apparatus main body 3, thereby to perform loading of the optical disk 2. Then, when a recording or playback command signal is input from a host computer of a host device into which the apparatus main body has been assembled, a spindle motor 43 is driven. Thereby, the optical disk 2 seated on a disk table is rotationally driven or rotated at the CLV (constant linear velocity) or CAV (constant angular velocity). In addition, upon start of the rotation of the optical disk 2, an optical pickup unit 50 is driven, thereby to perform reading of recorded data or writing of intended data on the optical disk 2.

Figure 3:
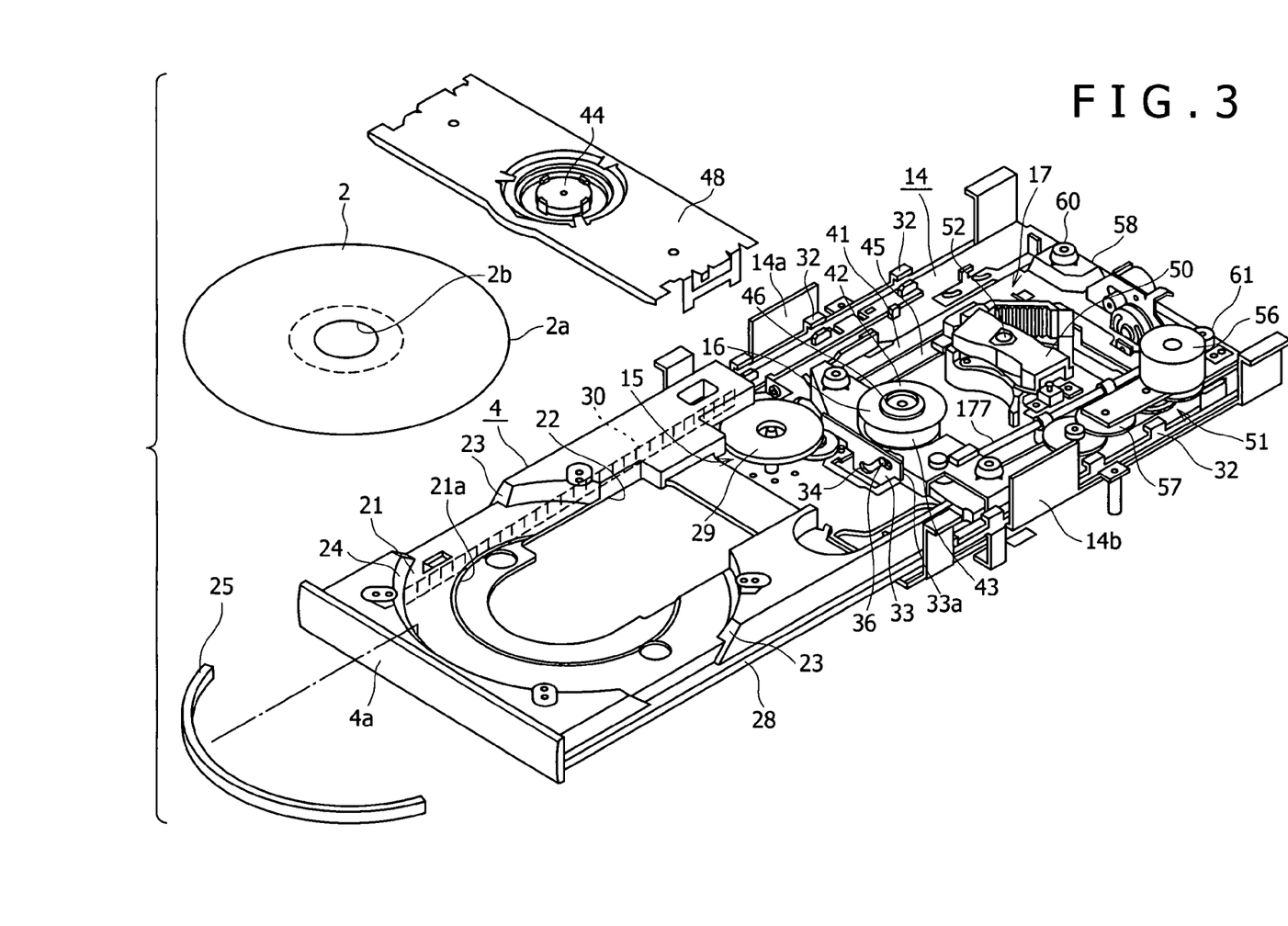
FIG. 3 is a perspective view showing the interior of the disk drive.

As shown in FIGS. 1 to 3, the apparatus main body 3 concurrently serving as an outer housing of the disk drive 1 is configured to include a substantially rectangular-box shaped bottom casing 6 serving as a lower housing, a top cover 7 for covering the bottom casing 6 from the upper position, and a front panel 8. The front panel 8 is provided to include an opening portion 9 through which the disk tray 4 (described below in more detail) is extended. The bottom casing 6 and the top cover 7 are both formed by using a thin metal sheet. The top cover 7 is substantially sectional U-shaped and is mated with the bottom casing 6. The front panel 8 is mounted on the side of a front face of the top cover 7 in the longitudinal direction. The opening portion 9, an indicator portion 10, and an operation button 11, for example, are formed to the front panel 8. The opening portion 9 works as a tray inlet-outlet opening in the event that the disk tray 4 is carried over the range between the inside and outside of the apparatus main body 3. The indicator portion 10 indicates the state of operation of the disk drive 1 by emitting light, for example. The operation button 11 is used to perform a shut-off operation of the disk tray 4.

As shown in FIG. 3, a chassis 14 is disposed in the inside of the apparatus main body 2. The chassis 14 is formed by blanking processing and bending processing of a thin metal sheet. On the chassis 14, there are provided the disk tray 4, a tray carrying mechanism 15, a disk rotation drive mechanism 16, and an optical pickup mechanism 17. The disk tray 4 carries the optical disk 2 over the range between a disk attaching/detaching position outside of the apparatus main body 3 and a disk loading position in the apparatus main body 3. The tray carrying mechanism 15 carries the disk tray 4. The disk rotation drive mechanism 16 rotationally drives the optical disk 2 carried to a loading position. The optical pickup mechanism 17 performs writing or reading of the information signal on the optical disk 2 being rotationally driven.

The disk tray 4, which is carried between the inside and outside of the apparatus main body 3 through the opening portion 9 of the front panel 8, is formed in the manner that a synthetic resin, such as an ABS resin, is formed into a rectangular plate. As shown in FIG. 2, in the disk tray 4 thus formed, there are formed a disk retaining portion 21 on the side of the tray end portion 4a in the longitudinal direction, and a bottom wall opening 22. The bottom wall opening 22 allows the disk rotation drive mechanism 16 and the optical pickup mechanism 17, which will be described further below, to oppose or face the side of the signal recording surface of the optical disk 2 over the range between the central portion of the disk retaining portion 21 and the side of a rear end positioned on the inward side of the apparatus main body 3.

Then, with the operation of the tray carrying mechanism 15 described further below, the disk tray 4 is carried through the opening portion 9 of the front panel 8 in the direction of an arrow A1 or A2 of FIG. 2 over the range between the inside and outside of the apparatus main body 3. In the disk tray 4, the tray end portion 4a is formed to substantially the same size as the opening portion 9 of the front panel 8. As shown in FIG. 1, when the disk tray 4 is carried into the apparatus main body 3, the tray end portion 4a shuts or closes the opening portion 9.

In the disk retaining portion 21, a substantially circular concave portion for storing and retaining the standard 12 cm diameter optical disk 2 is formed. The disk retaining portion 21 is formed with a diameter slightly larger than the outer diameter of the optical disk 2. A circular-arc peripheral wall 24 upwardly raised is formed on the periphery of the disk retaining portion 21. The peripheral wall 24 has a height identical to or slightly larger than the thickness of the optical disk 2 stored in the disk retaining portion 21. The peripheral wall 24 is thus formed to oppose an outer peripheral surface 2a of the optical disk 2 that is rotationally driven by the disk rotation drive mechanism 16. The peripheral wall 24 has a cutout portion 23 formed to facilitate the insertion and removal of the optical disk 2.

Figure 4:
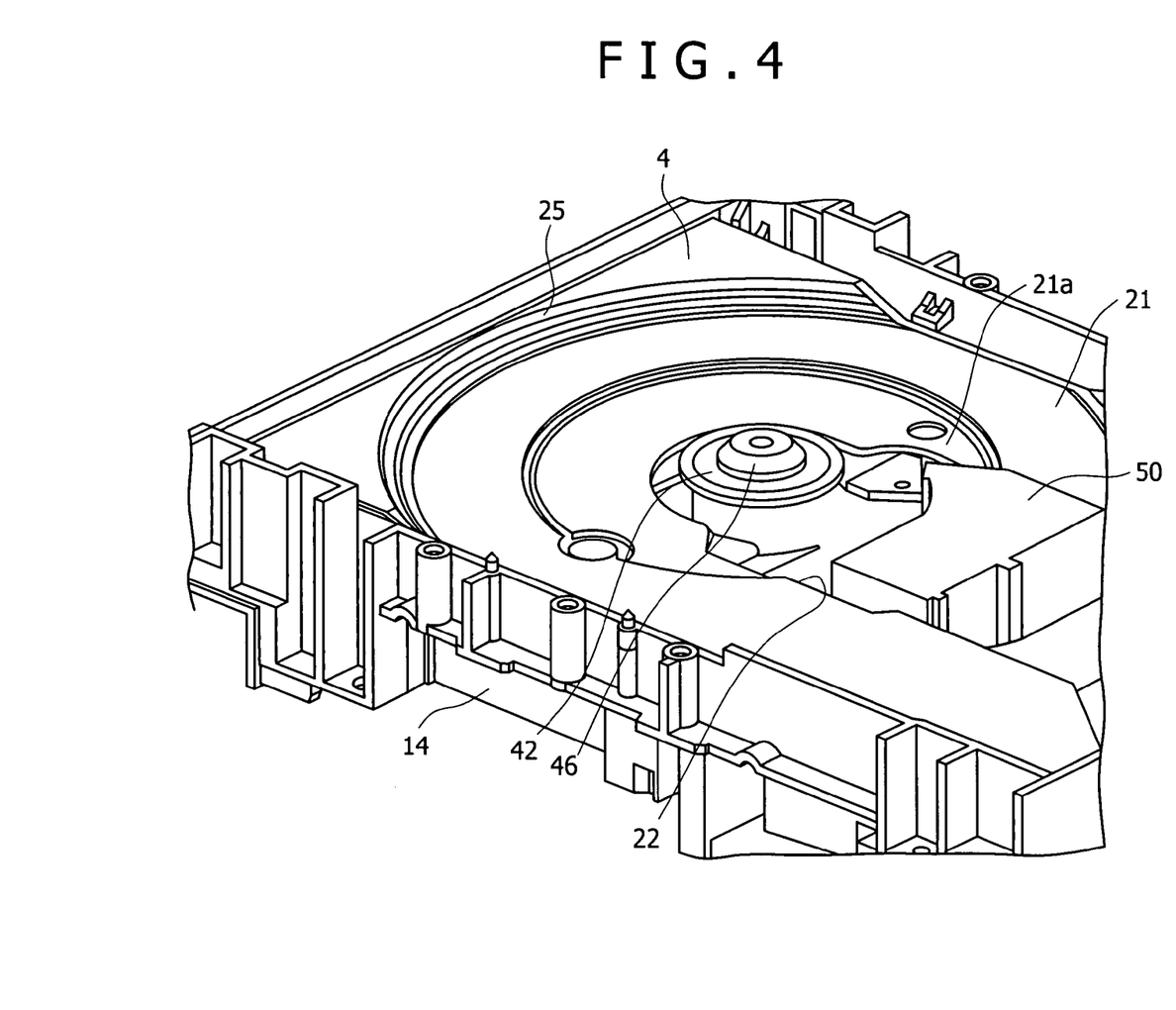
FIG. 4 is a perspective view showing an elastic cover provided to a peripheral wall of a disk tray.

Referring now to FIG. 4, the peripheral wall 24 is provided with an inclination formed to guide the optical disk 2 to the center of the disk retaining portion 21. In addition, on the peripheral wall 24, an elastic cover 25 is bonded that serves to reduce or prevent crushing of the optical disk 2 in the event that an optical disk 2 regarded as an inferior product, such as that having a crack or insufficient durability, is cracked while being rotated at high speed.

Figure 5:
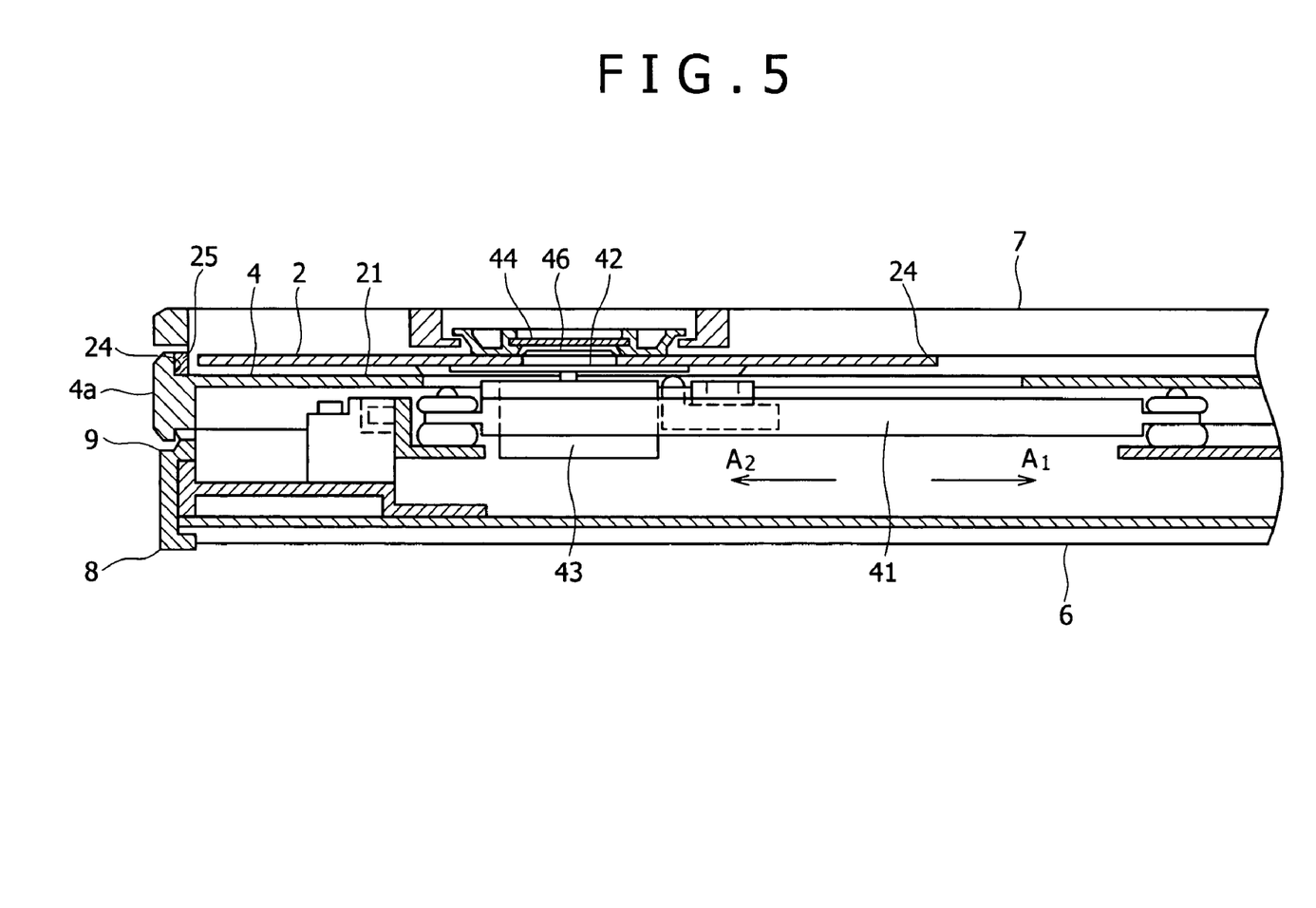
FIG. 5 is a cross sectional view of the disk drive rotatably retaining an optical disk.
Figure 6:
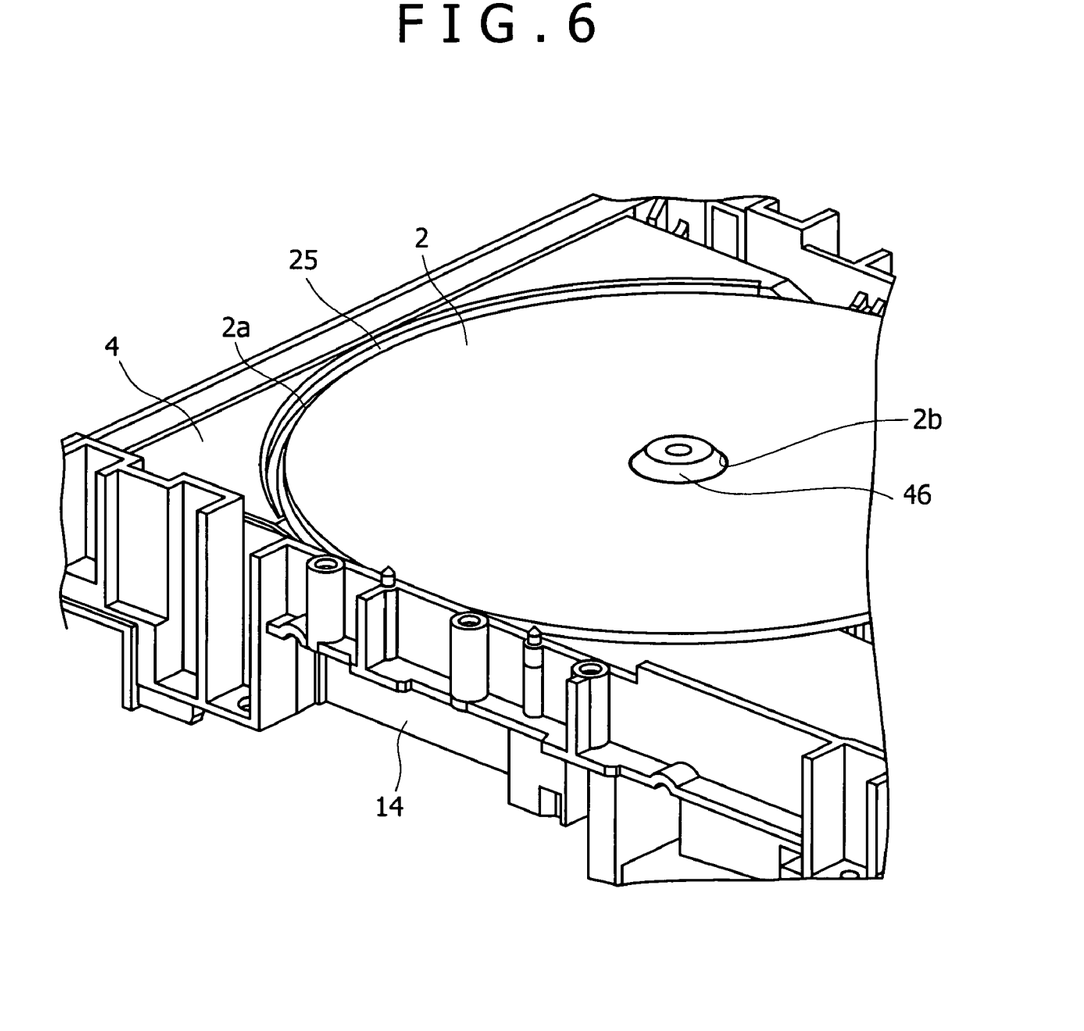
FIG. 6 is a perspective view showing a disk tray into which the optical disk is stored.

The elastic cover 25 is formed by using an elastic material, such as poron, having a high shock absorption function, and is formed into a lengthy shape. The elastic cover 25 is bonded by using an adhesive on the entirety of the peripheral wall 24, except for some portions or the cutout portion 23 of the peripheral wall 24. The elastic cover 25 works as a buffer member that absorbs shock occurring in the event that the optical disk 2 is cracked and collides with the peripheral wall 24. Accordingly, the optical disk 2 can be prevented from being crushed even when the optical disk 2 has collided with the peripheral wall 24 optical disk 2. In addition, as described above, the peripheral wall 24 is provided to oppose outer peripheral surface 2a of the optical disk 2 that is rotationally driven by the disk rotation drive mechanism 16. As such, similarly, as shown in FIGS. 5 and 6, the elastic cover 25 is provided in the position opposite to the outer peripheral surface 2a of the optical disk 2 being rotationally driven. Accordingly, even when the optical disk 2 has been cracked by the load occurring with high speed rotation, shock is absorbed by the elastic cover 25. As such, while large debris of the optical disk 2 occurs, fine debris does not occur with crushing of the optical disk 2. Consequently, in the disk drive 1, debris of the optical disk 2 does not disperse from the opening portion 9 of the front panel 8, therefore making it possible to minimize damage.

The elastic cover 25 may be bonded on a portion of the peripheral wall, such as only the side of the tray end portion 4a of the disk tray 4. Even in this case, the elastic cover 25 absorbs shock occurring in the event of collision of the optical disk 2 with the peripheral wall 24, thereby preventing the optical disk 2 from being finely crushed. In addition, in the above case, the elastic cover 25 is provided on the side of the tray end portion 4a that is positioned on the side of the opening portion 9 of the front panel 8 when the disk tray 4 is carried inside the apparatus main body. Consequently, the optical disk 2 can be prevented from being finely crushed in the vicinity of the opening portion 9. Further, since fine debris of the optical disk 2 does not occur in the vicinity of the opening portion 9, debris of the optical disk 2 can be prevented from dispersing from the opening portion 9.

For the disk drive 1 to which the present invention has been adapted, in lieu of the elastic cover 25, a rubber coating having a shock absorption function may be applied on the peripheral wall 24 of the disk retaining portion 21.

As described above, the disk retaining portion 21 of the disk tray 4 is formed to the size sufficient to retain a 12 cm diameter optical disk 2. In the inside of the disk retaining portion 21, an auxiliary disk retaining portion 21a is provided that retains a small 8 cm diameter optical disk 2, for example, by matching the center of the disk with the center of the disk retaining portion 21. The auxiliary disk retaining portion 21a is formed in the manner that concave portion of substantially the same size as the 8 cm diameter optical disk 2 is provided in the bottom wall portion of the disk retaining portion 21.

In the disk tray 4, a pair of left and right guide rails 28 are integrally formed parallel with the carrying direction in two lateral portions opposite to one another. In addition, in the disk tray 4, a rack gear 30 engaging or meshing with a tray carrying gear 29 of the tray carrying mechanism 15 is provided on a lateral portion on the side of the bottom wall. Further, as shown in FIG. 3, the pair of left and right guide rails 28 are supported by a plurality of tray guide portions 32. The tray guide portions 32 are formed of a synthetic resin, and are fitted to inner sides of left and right side walls 14a and 14b of the chassis 14 that are opposite to one another. The disk tray 4 is guided by the tray guide portions 32, and is moved along the inside and outside directions of the apparatus main body 3.

The tray carrying mechanism 15, which operates the disk tray 4 to move over the range between the inside and outside of the apparatus main body 3, is disposed on the side of the front face of the chassis 14 disposed in the apparatus main body 3, as shown in FIG. 3. The tray carrying mechanism 15 has a loading motor (not shown) and the tray carrying gear 29, as shown in FIG. 3. The loading motor is mounted to the bottom wall on the side of the front face of the chassis 14. The tray carrying gear 29 is engaged or meshed with a driving gear fitted on a rotation shaft of the loading motor, thereby to be rotated by the loading motor, as shown in FIG. 3.

The tray carrying gear 29 is engaged or meshed with the rack gear 30 thereby to be connected to the disk tray 4. Accordingly, upon driving of the loading motor, the disk tray 4 is carried over the range between the inside and outside of the apparatus main body 3 through the tray carrying gear 29.

In addition, as described further below in detail, the tray carrying mechanism 15 includes a gear member provided to move an elevational operation plate 33. The elevational operation plate 33 causes elevational operation of the spindle motor that constitutes the disk rotation drive mechanism 16 mounted to the chassis 14. The gear member is engaged or meshed with the tray carrying gear 29, and the loading motor is rotationally driven, whereby the elevational operation plate 33 is moved.

As shown in FIG. 3, an inclination cam groove 34 is provided to an elevation piece 33a of the elevational operation plate 33. The inclination cam groove 34 is formed by being bent up vertical on the bottom wall of the chassis 14. The inclination cam groove 34 is formed to rightwardly rise as viewed in FIG. 3, and an elevational operation pin 36 of the disk rotation drive mechanism 16 is slidably engaged with the inclination cam groove 34. Thereby, the elevational operation plate 33 is moved along the direction perpendicular to the carrying direction of the disk tray 4, as viewed in FIG. 3. In accordance with the movement, the elevational operation pin 36 is moved along the inclination cam groove 34. Thereby, the spindle motor 43 on the side of the disk rotation drive mechanism 16 is vertically moved to be proximal or distal with respect to the disk tray 4 that moves on the chassis 14.

Elevational operation of the spindle motor 43 is performed in the state where the disk tray 4 is stored in the apparatus main body 3. The operation is thus arranged to prevent collision of the disk tray 4 with the spindle motor 43 in the course of the movement of the disk tray 4 to the side of the spindle motor 43. For this reason, the gear member for moving the elevational operation plate 33 is regulated in operation corresponding to the position of movement of the disk tray 4. When the elevational operation plate 33 is moved, the elevational operation pin 36 is moved the lower position and the upper position along the inclination cam groove 34.

The disk rotation drive mechanism 16 will now be described hereinbelow. The drive mechanism 16 is retained by the above-described disk tray 4 to allow mounting of the optical disk 2 carried into the apparatus main body 3, whereby the optical disk 2 is rotatably retained. The disk rotation drive mechanism 16 has a disk table 42 that rotatably retains the optical disk 2; the spindle motor 43 that rotates the disk table 42; and a disk damper 44 that, in cooperation with the disk table 42, clamps the optical disk 2 mounted on the disk table 42.

The disk table 42 and the spindle motor 43 of the disk rotation drive mechanism 16 mounted to a first support frame 41 that is supported to the chassis 14 to be inclinable along the vertical direction. As shown in FIG. 3, the disk clamper 44 mounted in such a manner as to form a bridge to the upper portion of the chassis 14. The first support frame 41 to which the disk table 42 and the spindle motor 43 are to be mounted is formed to be rectangular by blanking processing of a thin metal sheet and bending down a peripheral portion of a sheet piece obtained by the processing. The first support frame 41 has a substantially rectangular cut-out opening portion that allows the optical pickup unit 50, which is mounted to a second support frame 45, to oppose or face the central portion.

In addition, the first support frame 41 has a vertical wall on the front end side thereof. On the vertical wall, the elevational operation pin 36 is formed that is mated with the above-described inclination cam groove 34 of the elevational operation plate 33, wherein the elevational operation pin 36 is elevationally operated while moving along the inclination cam groove 34. When the side of the front end of the first support frame 41, that is, the first support frame 41, is supported by the chassis 14 and is located inside the apparatus main body 3, the disk table 42 and the spindle motor 43 are mounted on the side positioned on the side of the opening portion 9, thereby to be elevationally operated together with the first support frame 41.

In addition, in a central portion of the upper surface of the disk table 42, a centering member 46 to be mated with a center hole 2b of the optical disk 2 being placed in the central portion is mounted to be retractable and extendable along the axial direction of a spindle shaft 47. When the spindle motor 43 is elevationally operated, the centering member 46 is fitted on the center hole of the optical disk 2, and the optical disk 2 is clamped by the disk damper 44 and the disk table 42. Thereby, the optical disk 2 is rotatably retained on the disk table 42.

In cooperation with the disk table 42, the disk clamper 44 clamps the optical disk 2 mounted on the disk table 42. As shown in FIG. 3, the disk table 42 is rotatably retained in a central portion of a damper support plate 48 at predetermined spacings provided in the vertical and diametrical directions. The damper support plate 48 is mounted in such a manner as to form a bridge between the upper end portions of both left and right sidewalls 14a and 14b of the chassis 14. In the mounted state, the disk damper 44 is positioned at the upper portion of the disk table 42.

The following describes the optical pickup mechanism 17 that performs recording and/or playback of the information signal on the optical disk 2 retained on the disk table 42 of the disk rotation drive mechanism 16. The optical pickup mechanism 17 has an optical pickup unit 50 and a pickup movement mechanism 51. The optical pickup unit 50 has an objective lens, and radiates laser light of a predetermined wavelength on the signal recording surface of the optical disk 2. The pickup movement mechanism 51 moves the optical pickup unit 50 along the direction of the diameter of the optical disk 2.

The optical pickup mechanism 17 is independently mounted to the second support frame 45 vertically inclinably supported to the first support frame 41. In this configuration, a signal recording surface of the optical disk 2 rotatably retained to the disk rotation drive mechanism 16 and an objective lens are arranged opposite to one another through an opening portion provided in the first support frame 41.

The disk drive 1 is configured as described herebelow to enable selective recording and/or playback of a standard density disk such as a CD, which has a standard record density, or a high density disk such as a DVD, which has an enhanced record density. In the optical pickup unit 50 being used in the disk drive 1, light reception and emission devices and optical systems corresponding to disk formats of a plurality of optical disks 2 are formed. In the configuration, a pickup portion 52 is provided that performs reception and emission of laser light of wavelengths corresponding to the respective optical disks 2.

The pickup movement mechanism 51, which moves the optical pickup unit 50 along the direction of the diameter of the optical disk 2, has a guide shaft 55, the carrying motor 56, a gear mechanism 57. The guide shaft 55 guides the movement through insertion into the apparatus main body of the optical pickup unit 50. The gear mechanism 57 transfers drive forces of the carrying motor 56 to the optical pickup unit 50.

The guide shaft 55 is supported parallel to the direction of the radial of the optical disk 2 by use of a support piece vertically provided to the second support frame 45. The guide shaft 55 is inserted into an insertion hole provided to the apparatus main body of the optical pickup unit 50. Thereby, the optical pickup unit 50 is guided by the guide shaft 55, and can be moved along the radial direction of the optical disk 2.

The carrying motor 56 is connected to the optical pickup unit 50 through the gear mechanism 57. When the carrying motor 56 is driven, the optical pickup unit 50 receives drive forces through the gear mechanism 57, and is carried thereby.

As described above, the elevational operation pin 36, which is engaged with the inclination cam groove 34 of the elevational operation plate 33 disposed on the chassis 14, is protrudingly provided at a substantially central portion of the end face on the side of the front end of the first support frame 41. Insulator mounting portions 58 and 59 are provided in two sides on the rear end side of the first support frame 41. Insulators 60 and 61 (in a pair) formed of an elastic material, such as rubber, are mounted in the insulator mounting portions 58 and 59. With the insulators 60 and 61 supported to support shafts vertically provided to the chassis 14, the first support frame 41 is elastically supported on the chassis 14.

Thus, the first support frame 41 is provided such that two sides on the rear end side thereof are supported on the chassis 14 through the pair of insulators 60 and 61, which are elastically displaceable. In addition, the front end side of the elevational operation pin 36 is supported by being engaged with the inclination cam groove 34 of the elevational operation plate 33. In this configuration, as viewed in FIG. 3, the elevational operation plate 33 is moved along the direction perpendicular to the carrying direction of the disk tray 4, and the elevational operation pin 36 moved in the vertical direction along the inclination cam groove 34. Thereby, the first support frame 41 is pivotally operated in the vertical direction with the pair of insulators 60 and 61 in support points. Consequently, the disk rotation drive mechanism 16 mounted to the front end side of the first support frame 41 is elevationally operated with respect to the disk tray 4.

The following will now describe operation of the disk drive 1, which is configured as described above, for recording and/or playback of an information signal on the optical disk 2. The operation is described with reference to a case where any one of disks, such as a CD, CD-ROM, DVD, and DVD-R of 12 cm in diameter, is used for the optical disk 2.

First, the disk drive 1 is powered on, whereby the disk tray 4 is extended ahead of the apparatus main body 3. Then the optical disk 2 is placed on the disk retaining portion 21 of the disk tray 4 fore from the opening portion 9 of the front panel 8. Thereafter, operations, such as pushing-in of the disk tray 4 and operation of the operation button 11 are carried out. Thereby loading operation is performed to move the disk tray 4 inside the apparatus main body 3.

Upon the movement of the disk tray 4 along the inward direction of the apparatus main body 3, it is detected by a loading detection switch (not described in detail) that the disk tray 4 has been moved to a loading position, and the loading motor is once stopped. Then, the loading motor undergoes reversal driving. In this event, upon the reversal driving of the loading motor, the elevational operation plate 33 is moved. Then, the elevational operation pin 36 provided to the first support frame 41 of the disk rotation drive mechanism 16 is moved from a lower position of the inclination cam groove 34 to an upper position thereof.

According to the above operation, the first support frame 41 is elevated to the side of the disk tray 4. Then disk table 42 is drawn inside the bottom wall opening 22 of the disk tray 4, and the optical disk 2 retained by the disk tray 4 is seated on the disk table 42. At substantially the same time, the disk damper 44 is compressed to the side of the disk table 42 and clamps the optical disk 2, whereby the optical disk 2 becomes ready to be rotatable integrally with the disk table 42.

In this event, when the first support frame 41 has moved to a position allowing the optical disk 2 to be clamped by the disk table 42, then the loading motor is stopped, and completion of loading is detected. Upon detection of the completion of loading, the spindle motor 43 of the disk rotation drive mechanism 16 starts driving.

Before the information signal is read from the optical disk 2 to perform playback thereof, it is determined whether or not the optical disk 2, which is the target of recording or playback, is a standard density disk, such as a CD, or a high density disk, such as a DVD. Subsequently, selection is made for an optical system of the pickup portion 52 of the optical pickup mechanism 17 in correspondence to the type of the optical disk 2, i.e., the target of playback. Then, recording or playback of the information signal is executed.

In this event, when executing high speed recording, such as eight-fold speed recording, of a disk such as a DVD-RW, the rotation speed of the optical disk 2 is 9,000 rpm or higher. In this event, suppose that because of presence of a crack or scratch on the optical disk 2, the optical disk 2 is cracked by the load associated with the high speed rotation. Even in such a case, however, since the elastic cover 25 is provided on the peripheral wall 24 of the disk retaining portion 21 formed in the disk tray 4, shock due to collision with the peripheral wall 24 can be reduced by the elastic cover 25. As such, while large debris of the optical disk 2 occurs, small debris as developed by crushing does not occur. Consequently, debris of the optical disk 2 can be prevented from dispersing from the opening portion 9 of the front panel 8.

Subsequently, when a user carries out the operation of terminating playback of the data, the rotation of the spindle motor 43 stops, whereby the playback operation of the optical pickup mechanism terminates. In addition, the optical disk 2 is detached from the disk table 42, and is then seated on the disk tray 4. Then the disk tray 4 is ejected and the disk retaining portion 21 is exposed ahead of the apparatus main body 3, whereby the eject operation terminates, and the optical disk 2 becomes ready to be removed.

It should be understood by those skilled in the art that various modifications, combinations, sub-combinations and alterations may occur depending on design requirements and other factors insofar as they are within the scope of the appended claims or the equivalents thereof.

What is claimed is:

1. A disk tray, comprising:
    a storage concave portion that stores a disk-shaped recording medium, wherein the disk tray is supported by a carrying mechanism to thereby be carried from an opening portion provided to a front face of an apparatus main body over a range between the inside and outside of the apparatus main body; and
    a buffer material provided on a peripheral surface of the storage concave portion that stores the disk-shaped recording medium.

2. A disk tray according to claim 1, wherein the buffer material is provided on a surface opposite to an outer peripheral surface of the disk-shaped recording medium stored in the storage concave portion.

3. A disk tray according to claim 1, wherein the buffer material is formed at least on the side of the opening portion of the disk tray carried into the apparatus main body.

4. A disk drive comprising:
    an apparatus main body;
    a disk tray that is provided in the apparatus main body and that includes a storage concave portion for storing a disk-shaped recording medium;
    a carrying mechanism that carries the disk tray over a range between the inside and outside of the apparatus main body from an opening portion provided to a front face of the apparatus main body;

a disk rotation drive mechanism that retains the disk-shaped recording medium carried into the apparatus main body and that rotationally drives the disk-shaped recording medium; and
a recording/playback mechanism that performs recording and/or playback of an information signal on the disk-shaped recording medium rotationally driven,
wherein the disk tray includes a buffer material provided on a peripheral surface of the storage concave portion that stores the disk-shaped recording medium.

5. A disk drive according to claim 4, wherein the buffer material is provided on a surface opposite to an outer peripheral surface of the disk-shaped recording medium stored in the storage concave portion of the disk tray.

6. A disk drive according to claim 4, wherein the buffer material is formed at least on the side of the opening portion of the disk tray carried into the apparatus main body.

* * * * *